(12) United States Patent
Chen

(10) Patent No.: US 11,143,940 B2
(45) Date of Patent: Oct. 12, 2021

(54) OPTICAL MODULE AND PROJECTOR

(71) Applicant: Coretronic Corporation, Hsin-Chu (TW)

(72) Inventor: Wei-Hao Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/858,736

(22) Filed: Apr. 27, 2020

(65) Prior Publication Data

US 2020/0355991 A1 Nov. 12, 2020

(30) Foreign Application Priority Data

May 7, 2019 (CN) .......................... 201920639496.5
Nov. 29, 2019 (CN) .......................... 201922106336.7

(51) Int. Cl.
| | |
|---|---|
| *G03B 21/14* | (2006.01) |
| *G03B 5/00* | (2021.01) |
| *G02B 26/08* | (2006.01) |
| *G02B 7/02* | (2021.01) |
| *H04N 9/31* | (2006.01) |

(52) U.S. Cl.
CPC ........... *G03B 21/142* (2013.01); *G02B 7/023* (2013.01); *G02B 26/08* (2013.01); *G03B 5/00* (2013.01); *H04N 9/315* (2013.01); *G03B 2205/0069* (2013.01)

(58) Field of Classification Search
None
See application file for complete search history.

(56) References Cited

U.S. PATENT DOCUMENTS

| | | | | |
|---|---|---|---|---|
| 2008/0252873 | A1* | 10/2008 | Onojima | G01S 7/4814 356/3 |
| 2009/0046339 | A1* | 2/2009 | Chen | G02B 26/0875 359/196.1 |
| 2016/0124216 | A1* | 5/2016 | Kojima | G02B 26/0816 359/199.3 |

FOREIGN PATENT DOCUMENTS

| | | |
|---|---|---|
| CN | 208351228 | 1/2019 |
| TW | M328591 | 3/2008 |

\* cited by examiner

*Primary Examiner* — Michelle M Iacoletti
*Assistant Examiner* — Danell L Owens
(74) *Attorney, Agent, or Firm* — JCIPRNET

(57) ABSTRACT

An optical module including a base and a rotating structure is provided. The rotating structure includes a frame and an optical element. The frame has at least one shaft portion. The frame is connected to the base through the shaft portion, and is configured to oscillate relative to the base along a rotation axis by taking the shaft portion as a rotating shaft. The optical element is disposed within the frame. The rotation axis passes through a center of gravity of the rotating structure. In addition, a projector having the optical module is also provided. The invention can prevent the rotating structure of the optical module from having an excessive rotational inertia.

22 Claims, 1 Drawing Sheet

OPTICAL MODULE AND PROJECTOR

CROSS-REFERENCE TO RELATED APPLICATION

This application claims the priority benefit of China application serial no. 201920639496.5, filed on May 7, 2019 and China application serial no. 201922106336.7, filed on Nov. 29, 2019. The entirety of the above-mentioned patent applications are hereby incorporated by reference herein and made a part of this specification.

BACKGROUND

Technical Field

The invention is related to an optical module and a projector, and more particularly to an optical module and a projector with optical vibration technology.

Description of Related Art

A projector is a display apparatus adapted to generate a large-sized image. According to the imaging principle of the projector, an illuminating beam generated by a light source is converted into an image beam by using a light valve, and then the image beam is projected onto a screen or a wall through a projection lens.

In current products, the resolution of an image converted by a conventional light valve has gradually failed to meet the market demand. In order to further increase the resolution of the image, a high-resolution light valve can be used in a projector device, but this will cause the projector device to become expensive in production cost. Moreover, in some projector devices, an optical module with optical vibration technology may be additionally configured, wherein a rotating structure thereof includes an optical element and is reciprocally deflectable to cause the optical element to perform oscillation. When an image beam from the light valve passes through the optical element, a transmission direction of the image beam can be reciprocally adjusted by the oscillation of the optical element so as to improve the resolution of the image. At present, conventional optical modules mostly drive the rotating structure to perform the swinging with two sets of symmetrically arranged driving units, and configure a rotation axis of the rotating structure to pass through a geometric center of the optical element. However, in order to save the configuration space and reduce the weight of the device, in some optical modules, only one set of driving unit is configured therein, and this single driving unit is typically disposed at a side of the rotation axis of the rotating structure such that the overall quality of the rotating structure is asymmetrical to the rotation axis, thereby resulting in a problem of having an excessive rotational inertia, which causes the rotating structure to be delayed excessively.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides an optical module and a projector capable of preventing a rotating structure of the optical module from having an excessive rotational inertia.

Other features and advantages of the invention can be further understood by the technical features disclosed in the invention.

To achieve one, part, or all of the objectives aforementioned or other objectives, an embodiment of the invention provides an optical module including a base and a rotating structure. The rotating structure includes a frame and an optical element. The frame has at least one shaft portion, and the frame is connected to the base through the shaft portion and configured to oscillate relative to the base along a rotation axis by taking the shaft portion as a rotating shaft. A first driving element is disposed on the frame, wherein the first driving element is disposed asymmetrically to the rotation axis. The optical element is disposed within the frame. The rotation axis passes through a center of gravity of the rotating structure.

To achieve one, part, or all of the objectives aforementioned or other objectives, an embodiment of the invention provides a projector including a light source, a light valve, a projection lens and an optical module. The light source is configured to provide an illumination beam. The light valve is configured to convert the illumination beam into an image beam. The projection lens is configured to project the image beam out of the projector. The optical module is disposed between the light valve and the projection lens and includes a base and a rotating structure. The rotating structure includes a frame and an optical element. The frame has at least one shaft portion, and the frame is connected to the base through the shaft portion and configured to oscillate relative to the base along a rotation axis by taking the shaft portion as a rotating shaft. A first driving element is disposed on the frame, wherein the first driving element is disposed asymmetrically to the rotation axis. The optical element is disposed within the frame and locate don a transmission path of the image beam. The rotation axis passes through a center of gravity of the rotating structure.

In view of the above, the embodiments of the invention have at least one of the following advantages or effects. In the optical module of the invention, by configuring the rotation axis of the rotating structure to pass through the center of gravity of the rotating structure rather than passing through a geometric center of the optical element, even if a single driving unit is disposed in the optical module in a manner of being asymmetric to the geometric center, the quality of the rotating structure will be symmetrical to the rotation axis and will not cause a problem of having an excessive rotational inertia, thereby preventing the rotating structure from being delayed excessively due to an actuation of a drive signal.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
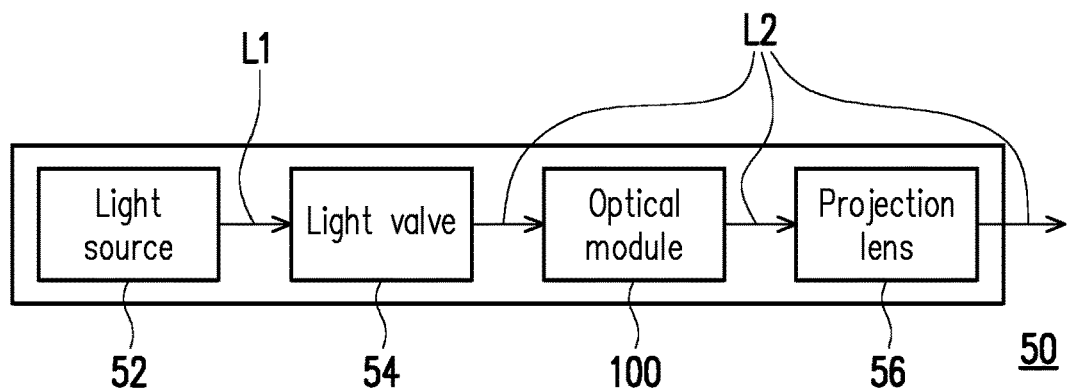
FIG. 1 is a schematic diagram of a projector according to an embodiment of the invention.

FIG. 1 is a schematic diagram of a projector according to an embodiment of the invention. Referring to FIG. 1, the projector 50 of the embodiment includes a light source 52, a light valve 54 and a projection lens 56. The light source 52 is configured to provide an illumination beam L1. The light valve 54 is located on a transmission path of the illumination beam L1, and is configured to convert the illumination beam L1 into an image beam L2. The projection lens 56 is located on a transmission path of the image beam L2, and is configured to project the image beam L2 out of the projector 50. In addition, the projector 50 further includes an optical module 100. The optical module 100 is disposed on the transmission path of the image beam L2 that is between the light valve 54 and the projection lens 56; and by means of optical vibration technology, the optical module 100 is enabled to swing back and forth to adjust a transmission direction of the image beam L2, thereby improving a resolution of an image formed by the image beam L2.

Figure 2:
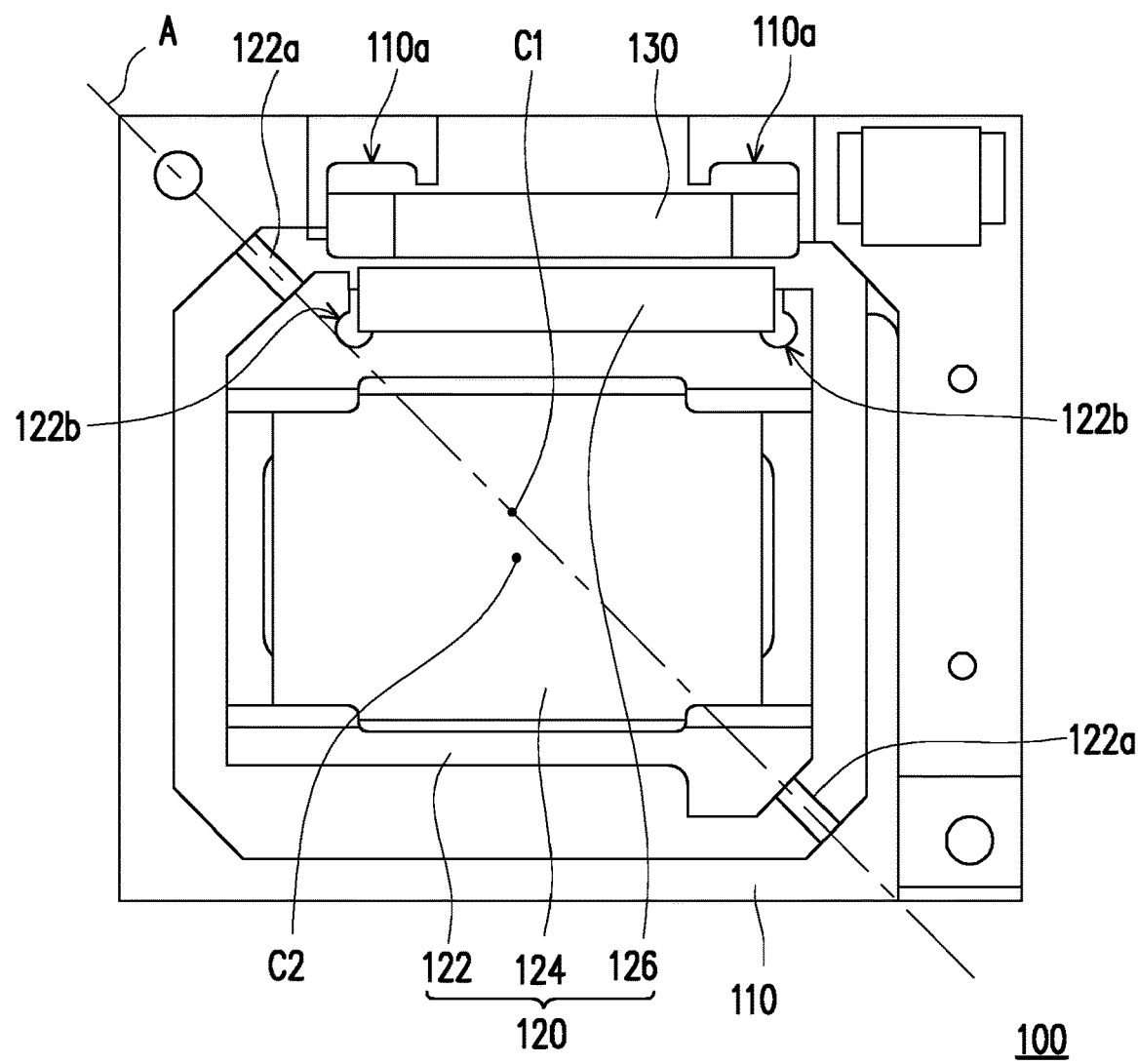
FIG. 2 is a schematic diagram of an optical module of FIG. 1.

FIG. 2 is a schematic diagram of the optical module of FIG. 1. Referring to FIG. 2, specifically, the optical module 100 includes a base 110 and a rotating structure 120. The rotating structure 120 includes a frame 122 and an optical element 124. The frame 122 has two shaft portions 122a, the frame 122 is connected to the base 110 through the two shaft portions 122a, and the frame 122 is configured to oscillate relative to the base 110 along a rotation axis A passing through the two shaft portions 122a by taking the two shaft portions 122a as a rotating shaft and via an elastic deformation of the two shaft portions 122a. The optical element 124 is, for example, a light-transmissive element or reflective element disposed within the frame 122, and the optical element 124 is configured to oscillate with a reciprocating deflection of the frame 122 along the rotation axis A, so as to enhance the resolution of the image formed by the image beam L2 passing through the optical element 124.

In the embodiment, the optical module 100 further includes a second driving element 130, and the rotating structure 120 further includes a first driving element 126. The second driving element 130 and the first driving element 126 constitute a driving unit for driving the rotating structure 120 to perform oscillation. Specifically, the second driving element 130 is, for example, a coil disposed on the base 110, and the first driving element 126 is, for example, a magnet disposed on the frame 122. The first driving element 126 is aligned to the second driving element 130, so the frame 122 can be reciprocally deflected by a magnetic force between the second driving element 130 and the first driving element 126. Specifically, the first driving element 126 and the second driving element 130 may be magnetic elements such as coils, magnets or ferromagnetic materials, wherein the configurational positions of the two are interchangeable based on the design.

The rotating structure 120 of the embodiment does not include any other driving element other than the first driving element 126, and the rotation axis A of the rotating structure 120 does not pass through the first driving element 126 so that a center of gravity C1 of the rotating structure 120 does not coincide with a geometric center C2 of the optical element 124. Moreover, the rotation axis A of the rotating structure 120 of the embodiment passes through the center of gravity C1 of the rotating structure 120 (that is, the center of gravity of the frame 122, the optical element 124 and the first driving element 126 as a whole) rather than passing through the geometric center C2 of the optical element 124. As such, even if a single driving unit is disposed in the optical module 100 in a manner of being asymmetric to the geometric center C2 or being asymmetric to the rotation axis A, the mass of the rotating structure 120 will be symmetrical to the rotation axis A and will not cause a problem of having an excessive rotational inertia, thereby preventing the rotating structure 120 from being delayed excessively due to an actuation of a drive signal. The embodiment only uses the first driving element 126 and the second driving element 130 as an example, and those skilled in the art would know that the first driving element 126 may be a single magnetic element or a plurality of magnetic elements disposed in the optical module 100 in the manner of being asymmetric to the geometric center C2 or in the manner of being asymmetric to the rotation axis A.

In order to achieve the above configuration, in the process of designing and manufacturing the optical module 100, the position of the center of gravity C1 of the rotating structure 120 may be calculated first, and then the position of the shaft portion 122a may be determined according to the center of gravity C1, so that the rotation axis A defined by the shaft portion 122a can pass through the center of gravity C1.

On the other hand, since the coil (that is, the second driving element 130) of the embodiment is disposed on the base 110 instead of the frame 122, during the oscillation of the frame 122, the wire extending from the coil does not have a risk of falling off due to the oscillation. However, the invention is not limited thereto. In other embodiments, the second driving element 130 disposed on the base 110 may be a magnet, and the first driving element 126 disposed on the frame 122 may be a coil.

Further, as shown in FIG. 2, the base 110 of the embodiment has at least one first dispensing slot 110a (illustrated as two), the frame 122 has at least one second dispensing slot 122b (illustrated as two), the first dispensing slots 110a abut the second driving element 130, and the second dispensing slots 122b abut the first driving element 126. Therefore, in the process of assembling the second driving element 130 and the first driving element 126, an adhesive can be firstly filled into the first dispensing slots 110a and the second dispensing slots 122b before assembling the second driving element 130 and the first driving element 126 respectively to the base 110 and the frame 122, so that the second driving element 130 and the first driving element 126 can be more firmly fixed by the adhesive. It is to be noted that, under the condition that the first driving element 126 is fixed by the adhesive, the center of gravity C1 is, for example, the overall center of gravity of the frame 122, the optical element 124, the first driving element 126 and the adhesive within the second dispensing slot 122b.

In summary, the embodiments of the invention have at least one of the following advantages or effects. In the optical module of the invention, by configuring the rotation axis of the rotating structure to pass through the center of gravity of the rotating structure rather than passing through the geometric center of the optical element, even if a single driving unit is disposed in the optical module in a manner of being asymmetric to the geometric center, the quality of the rotating structure will be symmetrical to the rotation axis and will not cause a problem of having an excessive rotational inertia, thereby preventing the rotating structure from being delayed excessively due to an actuation of a drive signal.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An optical module, comprising a base and a rotating structure, wherein:
   the rotating structure comprises a frame, a first driving element and an optical element, wherein:
      the frame has at least one shaft portion, wherein the frame is connected to the base through the at least one shaft portion, and is configured to oscillate relative to the base along a rotation axis by taking the at least one shaft portion as a rotating shaft;
      the first driving element is disposed on the frame, wherein the first driving element is disposed asymmetrically to the rotation axis; and
      the optical element is disposed within the frame,
      wherein the rotation axis passes through a center of gravity of the rotating structure, and the rotation axis passes through the optical element and does not pass through a geometric center of the optical element.

2. The optical module as recited in claim 1, further comprising a second driving element disposed on the base, wherein the first driving element is aligned to the second driving element.

3. The optical module as recited in claim 2, wherein the second driving element is a coil, and the first driving element is a magnet.

4. The optical module as recited in claim 3, wherein the coil is disposed on the base.

5. The optical module as recited in claim 2, wherein the base has at least one first dispensing slot, the frame has at least one second dispensing slot, the at least one first dispensing slot abuts the second driving element, and the at least one second dispensing slot abuts the first driving element.

6. The optical module as recited in claim 5, wherein the center of gravity of the rotating structure is the overall center of gravity of the frame, the optical element, the first driving element and an adhesive within the at least one second dispensing slot.

7. The optical module as recited in claim 1, wherein the first driving element is comprised of a single magnetic element, and the rotating structure does not comprise any driving element other than the first driving element.

8. The optical module as recited in claim 1, wherein the rotation axis does not pass through the first driving element.

9. The optical module as recited in claim 1, wherein the center of gravity of the rotating structure does not coincide with the geometric center of the optical element.

10. The optical module as recited in claim 1, wherein the frame is configured to oscillate by an elastic deformation of the at least one shaft portion.

11. The optical module as recited in claim 1, wherein the optical element is a light-transmissive element or a reflective element.

12. A projector, comprising a light source, a light valve, a projection lens and an optical module, wherein:
the light source is configured to provide an illumination beam;
the light valve is configured to convert the illumination beam into an image beam;
the projection lens is configured to project the image beam out of the projector; and
the optical module is disposed between the light valve and the projection lens and comprises a base and a rotating structure, wherein:
the rotating structure comprises a frame, a first driving element and an optical element, wherein:
the frame has at least one shaft portion, wherein the frame is connected to the base through the at least one shaft portion, and is configured to oscillate relative to the base along a rotation axis by taking the at least one shaft portion as a rotating shaft;
the first driving element is disposed on the frame, wherein the first driving element is disposed asymmetrically to the rotation axis; and
the optical element is disposed within the frame and located on a transmission path of the image beam,
wherein the rotation axis passes through a center of gravity of the rotating structure, and the rotation axis passes through the optical element and does not pass through a geometric center of the optical element.

13. The projector as recited in claim 12, wherein the optical module comprises a second driving element disposed on the base, wherein the first driving element is aligned to the second driving element.

14. The projector as recited in claim 13, wherein the second driving element is a coil, and the first driving element is a magnet.

15. The projector as recited in claim 14, wherein the coil is disposed on the base.

16. The projector as recited in claim 13, wherein the base has at least one first dispensing slot, the frame has at least one second dispensing slot, the at least one first dispensing slot abuts the second driving element, and the at least one second dispensing slot abuts the first driving element.

17. The projector as recited in claim 16, wherein the center of gravity of the rotating structure is the overall center of gravity of the frame, the optical element, the first driving element and an adhesive within the at least one second dispensing slot.

18. The projector as recited in claim 12, wherein the first driving element is comprised of a single magnetic element, and rotating structure does not comprise any driving element other than the first driving element.

19. The projector as recited in claim 12, wherein the rotation axis does not pass through the first driving element.

20. The projector as recited in claim 12, wherein the center of gravity of the rotating structure does not coincide with the geometric center of the optical element.

21. The projector as recited in claim 12, wherein the frame is configured to oscillate by an elastic deformation of the at least one shaft portion.

22. The projector as recited in claim 12, wherein the optical element is a light-transmissive element or a reflective element.

* * * * *